United States Patent [19]
Velthoven

[11] 3,783,734
[45] Jan. 8, 1974

[54] CLAMP LOAD INDICATING AND SEALING FASTENER ASSEMBLY

[75] Inventor: Arthur E. Velthoven, Werren, Mich.

[73] Assignee: Federal Screw Works, Detroit, Mich.

[22] Filed: Aug. 28, 1972

[21] Appl. No.: 284,284

[52] U.S. Cl. .................................................. 85/62
[51] Int. Cl. ........................................... F16b 31/02
[58] Field of Search .................... 85/61, 62; 151/38

[56] References Cited
UNITED STATES PATENTS

| | | | |
|---|---|---|---|
| 1,505,508 | 8/1924 | Trager | 85/62 |
| 2,273,772 | 2/1942 | Pollitz | 85/62 |
| 3,144,803 | 8/1964 | Brilles | 85/62 |
| 3,285,120 | 11/1966 | Kartiala | 85/62 |
| 3,469,492 | 9/1969 | Dahl | 85/62 |
| 3,622,167 | 11/1971 | Velthoven | 85/62 |

*Primary Examiner*—Marion Parsons, Jr.
*Attorney*—Paul D. Seibold et al.

[57] ABSTRACT

A fastener assembly in which a plastic member is snap fitted on a threaded metallic fastener. As the fastener is tightened the plastic is extruded into the fastened joint. When the clamp load reaches a predetermined value, the plastic is severed by the fastener, causing the outer peripheral portion of the plastic to fall off the fastener. This gives a visible signal that the desired clamp load has been reached.

7 Claims, 6 Drawing Figures

PATENTED JAN 8 1974  3,783,734

CLAMP LOAD INDICATING AND SEALING FASTENER ASSEMBLY

SUMMARY OF THE INVENTION

The present invention is embodied in a composite fastener assembly consisting of a metallic fastener body and a resinous plastic member snap fitted on said metallic fastener body. While the fastener assembly performs a sealing function, the invention resides in the structural features of the assembly by which it gives a visible signal when the fastener has been tightened to a predetermined clamp load. The invention bears certain similarities to the fastener assembly shown in my prior U.S. Pat. No. 3,622,167. This prior patent, however, was concerned primarily with the sealing function rather than a clamp load indicating function. The structure of the present fastener assembly is intended to respond to the needs of design engineers for a fastener which will give a reliable signal when it has been tightened to a desired clamp load, thus permitting the installer of the fastener to terminate the tightening of the fastener when the signal is given.

The design of the present invention has the further advantage that the plastic material which is extruded under the seat of the nut tends to lubricate the fastener, permitting the fastener to achieve the desired clamp load at lower torques. Of course, the fastener assembly of the present invention preserves the advantage of the fastener shown in my prior U.S. Pat No. 3,622,167 in that a fluid tight seal is obtained in the joint being fastened.

The present invention is further distinguished by its simplicity of design, moderate cost, ease of manufacture, sturdy and rugged construction, reliable performance, ease of installation, ease of assembly and the ability of the parts of the fastener assembly to remain assembled and not come apart during shipment or the like.

DETAILED DESCRIPTION OF THE PREFERRED EMBODIMENTS

Figure 1:
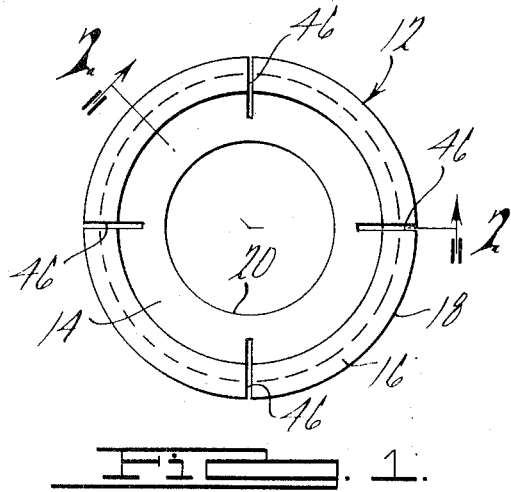
FIG. 1 is a plan view of the seal portion of a fastener assembly of the present invention.
Figure 2:
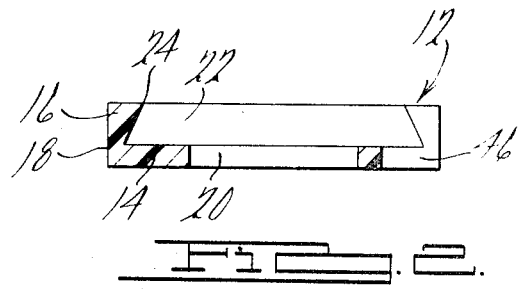
FIG. 2 is a sectional view of the structure illustrated in FIG. 1 taken along the line 2—2 thereof.
Figure 3:
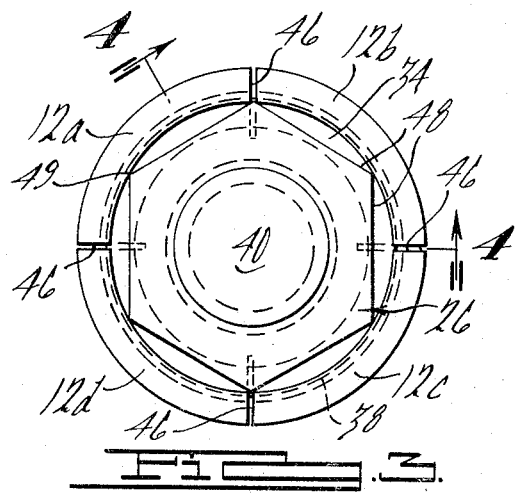
FIG. 3 is a plan view of a fastener assembly of the present invention incorporating the seal of FIG. 1, the parts being shown immediately prior to the tightening of the fastener.

Referring now to the drawings, FIGS. 1 and 2 illustrate a molded resinous plastic member 12 having a flat annular washer portion 14 and an annular retainer portion or collar 16 which projects upwardly from the outer periphery 18 of the washer portion 14. The washer portion 14 has a central opening 20 of a diameter larger than the thread diameter of the fastener with which it is to be used. The collar 16 possesses a cone-shaped inner wall 22 which tapers upwardly and inwardly to an upper annular edge 24. The seal 12 is preferably made from a high density polyethylene. The seal 12 is used in conjunction with a rigid metallic fastener body consisting of a nut 26 in FIGS. 3 and 4. The nut 26 has a thread 28 extending axially therethrough and a flange 30 at its lower end. The flange 30 has a seat 32 on its lower side and a tapered annular shoulder 34 on its upper side. An annular recess 36 is formed in the lower end of the nut between the thread 28 and the seat 32.

Figure 4:
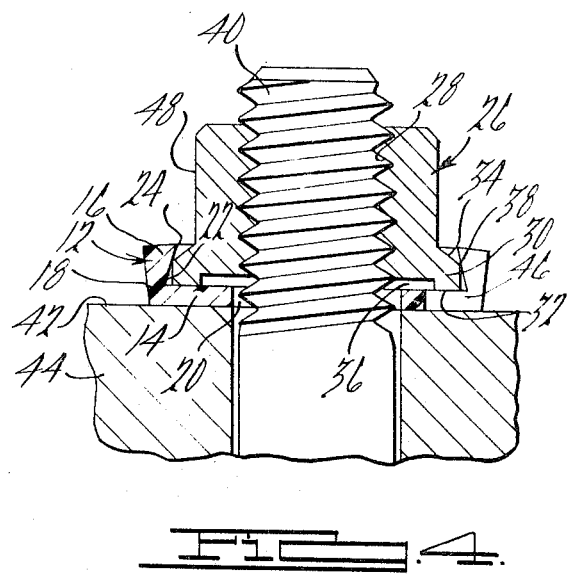
FIG. 4 is a sectional view of the structure illustrated in FIG. 1 taken along the line 2—2 thereof.
Figure 5:
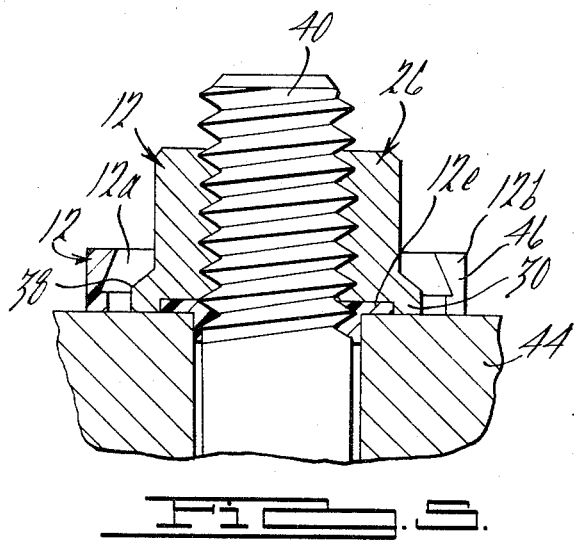
FIG. 5 is a sectional view similar to FIG. 4 but showing the shape and position of the parts after the tightening of the fastener.

Looking at FIG. 4 it will be seen that the collar wall 22 rests against the lower edge 38 of the flange shoulder 34, with the collar 16 being fitted over the flange 30. By this means, the seal 12 is held on the nut 26 with the washer portion 14 in engagement with the seat 32. The nut 26 is shown threaded onto a stud 40 with the washer portion 14 being positioned against the flat surface 42 of a member 44 to be fastened.

It will be seen that the entire seal 12 lies adjacent the lower end of the nut and does not interfere with the ability of the installer of the fastener assembly to place a wrench (not shown) in engagement with wrench receiving flat walls 48 formed on the nut above the flange 30. The "corners" 49 located between the flat walls 48 engage the seal edge 38. From FIG. 4 it will be seen that the flange 30 biases the seal collar 16 radially outwardly, with the collar gripping the flange 30 at its lower edge 38.

The plastic member 12 of the present invention is distinguished by the formation therein of four slits or circumferential discontinuities 46 which extend radially inwardly from the outer periphery 18 of the plastic member 12. It will be noted that the slits 46 terminate in locations which are spaced radially outwardly from the inner periphery 20 of the member 12. However, they do extend into and slightly through locations which are axially aligned with the seat 32.

The tightening of the nut 26 has the effect of radially inwardly extruding part of the sealing portion 14 of the member 12. It also severs the member 12 in an annular path which is effective to divide it into five segments. The first four segments, which are identified as 12a, 12b, 12c and 12d, constitute four similarly shaped generally 90° sectors of the portion of the member 12 radially outwardly of the seat 32. The fifth segment which is identified as 12e is the radially inner part of washer portion 14 which is extruded into the recess 36 and into intimate engagemet with the threads of the screw 40 on which the nut 26 is threaded. The segments 12a, 12b, 12c and 12d readily fall off the nut 26 when the washer portion 14 is severed, giving the installer of the fastner assembly an immediate visual indication that the severin action has taken place.

By the appropriate design of the thickness of the washer portion 14, the selection of the material for the member 12 and the size of the seat 32 it has been found that the clamp load prevailing in the joint at the time that the severing action takes place can be controlled with remarkable consistency. Thus the severing action may be caused to occur at a desired clamp load and the installer will terminate the rotation of the nut when the severing action occurs. For example, in one three-eighth inch fastener assembly using a member 12 made from high density polyethylene it was found that the severing action took place consistently at 5,200 pounds. The nut utilized was a standard grade B nut with 24 threads to the inch.

Figure 6:
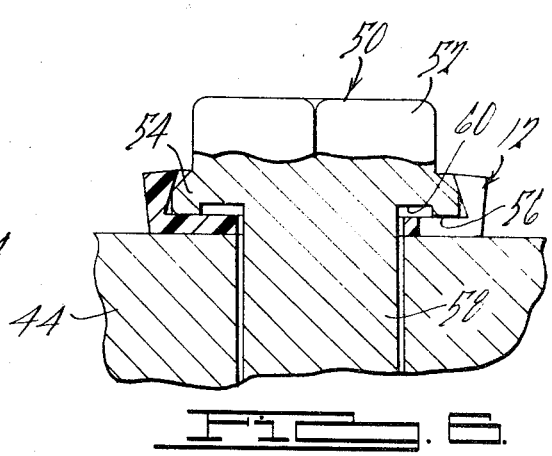
FIG. 6 is a view of structure similarly illustrated in FIG. 4 showing a modified form of the present invention.

A slightly modifed form of the invention is illustrated in FIG. 6 in which the member 12 is shown positioned on a screw 50 having a head 52 provided with a flange 54 which is in all respects similar to the flange 30 of the nut 26. It will be seen that the screw has a seat 56 and a threaded shank 58, with a recess 60 being formed between the seat 56 and the shank 58. The seat 56 is operable to sever the member 12 in the same manner as the seat 32 of the nut 26 to indicate the clamp load applied to the screw 50.

What is claimed is:

1. A fastener assembly including a hard metallic fastener body having a thread and a radially outwardly projecting annular flange provided with a seat adjacent the outer periphery of said body and an extrudable resinous plastic member having an annular washer portion in confronting relation to said seat and a retainer portion fitted over said flange to hold said member on said body with said washer portion adjacent said seat, said member having a plurality of circumferential discontinuities extending radially inwardly from its outer periphery into axial alignment with said seat, said discontinuities terminating short of the inner periphery of said member, said seat being operable to extrude and sever said washer portion upon the tightening of the fastener assembly, whereby the portion of said member radially outwardly of said seat will be divided into a plurality of segments which readily separate from said fastener.

2. The structure set forth in claim 1 in which said discontinuities comprise relatively thin slits.

3. The structure set forth in claim 1 in which said retainer portion comprises a discontinuous collar extending upwardly and inwardly from said sealing portion.

4. The structure set forth in claim 1 in which said fastener body is provided with an annular recess between said seat and said thread.

5. The structure set forth in claim 1 in which said fastener comprises a nut.

6. The structure set forth in claim 1 in which said fastener comprises a screw.

7. The structure set forth in claim 1 in which said member is made from polyethylene.

* * * * *